Figure 1:
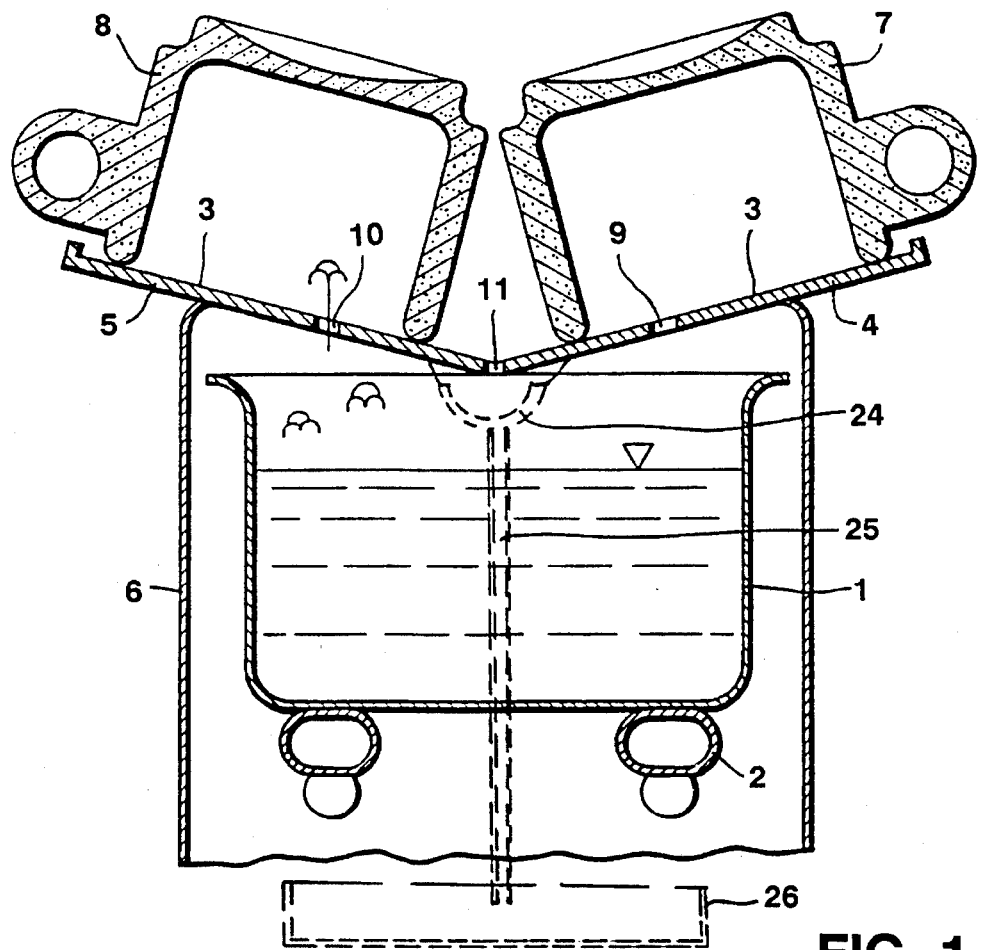

United States Patent

Klawuhn et al.

Patent Number: 5,509,348
Date of Patent: Apr. 23, 1996

[54] COFFEE MAKER FOR THE PREHEATING AND KEEPING WARM OF CUPS

[75] Inventors: Manfred Klawuhn, Frankfurt am Main; Walter Hufnagl, Sulzbach; Roland Müller, Dreieich; Gerhard Schäfer, Frankfurt am Main; Andreas Peter, Kronberg, all of Germany

[73] Assignee: Braun Aktiengesellschaft, Frankfurt, Germany

[21] Appl. No.: 307,806

[22] PCT Filed: Feb. 17, 1993

[86] PCT No.: PCT/EP93/00375

§ 371 Date: Sep. 27, 1994

§ 102(e) Date: Sep. 27, 1994

[87] PCT Pub. No.: WO93/19656

PCT Pub. Date: Oct. 14, 1993

[30] Foreign Application Priority Data

Apr. 2, 1992 [DE] Germany .................. 42 10 886.1

[51] Int. Cl.⁶ ................................. A47J 31/54
[52] U.S. Cl. ................ 99/290; 126/369; 99/293
[58] Field of Search ................. 99/290, 279, 293, 99/323.1, 323.3, 288; 126/369, 369.1, 369.2; 122/459

[56] References Cited

U.S. PATENT DOCUMENTS

| | | |
|---|---|---|
| 2,152,410 | 3/1939 | Illy ............................ 99/290 |
| 3,495,583 | 2/1970 | Katzman et al. |
| 3,949,733 | 4/1976 | Miller et al. |
| 4,287,817 | 9/1981 | Moskowitz ................. 99/293 |
| 4,565,121 | 1/1986 | Ohya ......................... 99/293 |
| 4,757,753 | 7/1988 | Pandolfi ..................... 99/290 |

FOREIGN PATENT DOCUMENTS

| | | |
|---|---|---|
| 0511945 | 11/1992 | European Pat. Off. |
| 596811 | 3/1978 | Switzerland . |
| 793944 | 4/1958 | United Kingdom . |
| 2059753 | 4/1981 | United Kingdom . |

Primary Examiner—Robert W. Jenkins
Attorney, Agent, or Firm—Fish & Richardson

[57] ABSTRACT

The invention is directed to a coffee maker for the preheating and keeping warm of cups, including a support surface (3) for cups (7, 8) and a heat source (2) delivering heat also to the cups (7, 8) resting on the support surface (3), wherein water held in a water reservoir (1) is heatable by means of the heat source (2) to a temperature such that vapors and/or steam are formed. Discharge orifices (9, 10) are provided in the support surface (3) for passage of the vapors and/or steam therethrough to circulate around the cups (7, 8) resting on the support surface (3), thereby heating them. In this manner, the cups are preheated readily and kept warm durably. In addition, the discharge orifices (9, 10) in the support surface may be closable by a spring-loaded flap structure (19) or a valve, a flap structure (19) or a valve being movable to an open position by the weight of a cup (7, 8).

16 Claims, 1 Drawing Sheet

U.S. Patent  Apr. 23, 1996  5,509,348

COFFEE MAKER FOR THE PREHEATING AND KEEPING WARM OF CUPS

This invention relates to a coffee maker for the preheating and keeping warm of cups, in particular for hot beverage preparation apparatus, including a support surface for at least one cup and a heat source delivering heat also to a cup resting on the support surface.

To prevent a hot beverage from cooling down shortly after it is filled into a cup due to heat transfer to the cup, resulting in loss of aroma, it is recommended to preheat the cup. This is particularly useful in cases where the quantity of the hot beverage filled in is relatively small by comparison with the volume of the cup, as is the case with espresso, for example.

A known coffee maker for the preheating and keeping warm of cups which finds a preferred application particularly in an espresso maker is comprised of a support surface made of special steel or the like which is heatable by a heat source and adapted to receive thereon one or several cups to be heated, with the heating and keeping warm of the cups being accomplished by heat transfer. For safety reasons, the temperature of the support surface should not exceed 40° C. to 50° C. to obviate the hazards of burning should the user accidentally come in contact with the support surface. As a result of such a relatively low temperature of the support surface, the amount of heat transferred to the cup is relatively low in consequence, so that preheating of the cup takes comparatively long.

Further, from the June 1988 "Espresso Novo" brochure No. 46348 of the firm of Krups Stiftung & Co. KG of Solingen, a coffee maker is known which serves particularly for the preparation of espresso beverages. In this coffee maker, a steam nozzle provided with a valve extends laterally from the housing, the nozzle being normally used for heating and frothing liquids, preferably milk. As described in the brochure, the steam discharged from the steam pipe may also serve the function of heating a cup by placing the cup directly under the jet of hot steam. However, as described in the brochure, when it is desired to prepare an espresso beverage subsequently, it is absolutely necessary for the coffee maker to be cooled down to coffee temperature. During this period, the cup will also cool down so that the advantage of preheating is almost canceled. Since this arrangement does not enable several cups to be kept warm continuously for use, it is not possible to fill several cups with an espresso beverage simultaneously when it is desired to preheat the cups.

It is an object of the present invention to provide a coffee maker of the type initially referred to which affords simple means enabling one or several cups to be preheated to a suitable temperature in a minimum of time and to be maintained at that temperature.

According to the present invention, this object is accomplished in that water is heatable by means of the heat source to a temperature such that vapors and/or steam are formed, and that at least one discharge orifice is provided in the support surface for passage of the vapors and/or steam therethrough to circulate around one or several cups resting on the support surface, thereby heating them. In the device of the present invention, the vapors and/or steam flowing into the interior and/or circulating around the exterior of the cup(s) heats the cup(s) by convection and condensation. Heat transfer is accomplished in a very favorable manner, enabling the cup to be preheated to the desired temperature in a very short time, depending on the temperature to which the water in the water reservoir is heated. As a result of condensation forming as steam or vapors impinge on the cup(s) when the temperature of the cup is still significantly lower than the temperature of the steam, the additional condensation heat occurring in the process contributes to heating the temperature of the cup(s) still further.

To produce vapors or steam with particular ease, the present invention provides for the steam to be generated in an upwardly open water reservoir disposed underneath the support surface. By heating the water in the reservoir, vapors or steam are formed depending on the temperature, flowing through the discharge orifice in the support surface upwardly into the interior of a cup, and warming the cup when it rests with its rim forming the opening on the support surface. When the cup is placed on the support surface with its bottom down, the steam will flow around the cup from outside, warming it equally well.

The present invention further provides for the discharge orifice in the support surface to be closable by a flap structure or a valve. This has the advantage that a reduced or zero amount of vapors or steam is allowed to escape during periods of non-use, thus eliminating the need for frequent refills with water. Still further, the closed flap structure prevents contaminants from entering the open boiler or water reservoir.

In an advantageous embodiment of the device of the present invention, the flap structure or the valve is moved to an open position by a cup as the cup is placed down on the support surface. This ensures that the flap or the valve is not open, exposing the discharge orifice for the passage of vapors and steam, until required for the heating and keeping warm of a cup.

To ensure that the discharge orifice is automatically reclosed when the cup is removed for use, a variety of means may be provided returning the flap structure or the valve to the closed position. In a preferred embodiment of the present invention, the flap structure or the valve are maintained in a closed position by a spring, the spring force being adapted to be overcome by the weight of a cup. Another advantage afforded by this arrangement is that it protects the user against a sudden spill of water in the event of the appliance being tilted, the flap structure or the valve closing automatically when the cup has slipped off its surface. However, the space between the water reservoir and the support surface should then be sealed laterally by walls to prevent the entry of steam or water into the electrical portions of the appliance, preventing short circuits from occurring.

To enable the condensation water necessarily precipitating in the interior of the cup as a result of the temperature difference between cup and vapors or steam to be drained and collected in an underlying trough, the present invention provides for the support surface to be inclined relative to the horizontal and to have a collection device for condensation water at its lowermost point. The collection device may comprise one or several drain holes in the support surface and/or a channel which open into an additional collection container or a trough. In a preferred embodiment of the device of the present invention, the support surface is comprised of two or more planar sections or plates inclined in opposite directions.

In an alternative embodiment of the present invention, the discharge orifice in the support surface opens into a steam distribution chamber provided underneath the support surface and connected in turn to a steam generating means supplied with energy from the heat source. This has the advantage that the device of the present invention is connectible to a pressure boiler or a thermoblock device as the steam generating means. The steam generated therein is directed to the steam distribution chamber whence it is allowed to pass through the discharge orifice in the support surface. This embodiment obviates the need for a separate open water reservoir.

According to the present invention, the discharge orifice in the support surface may also be in direct communication with a steam generating means supplied with energy from the heat source. When used solely for the preheating of cups, the thermoblock device or the pressure boiler may be heated using a reduced energy supply, for example, by actuating a switch.

Embodiments of the present invention will be described in more detail in the following with reference to the accompanying drawings. In the drawings, FIG. 1 is a sectional view of an embodiment of the device according to the present invention; and FIG. 2 is a sectional view of another embodiment of the device according to the present invention.

Figure 2:
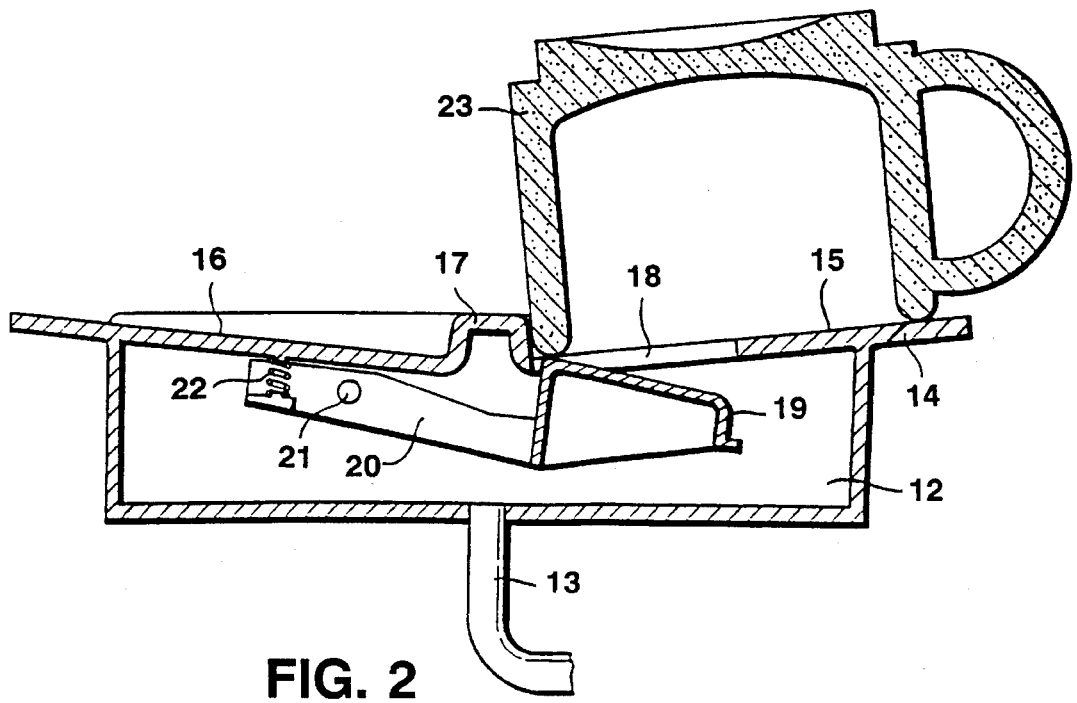

Referring now to FIG. 1 of the drawings, a device is shown for preheating cups and keeping them warm, including an upwardly open water reservoir 1 in which water can be heated by a heating spiral 2 provided at the bottom of the water reservoir 1. Arranged above the opening of the water reservoir 1 is a support surface 3 comprised of two plates 4, 5 of equal size inclined towards each other in V-shape and resting on a housing 6 enclosing the water reservoir 1. The size of the support surface 3 is conformed to the size of the water reservoir 1. In the Figure, only two cups 7, 8 are shown, each cup sitting on one of the plates 4, 5. It will be understood, of course, that the support surface 3 may be dimensioned sufficiently large to accommodate a larger number of cups.

Provided in each plate 4, 5 is a respective discharge orifice 9, 10 for the passage of vapors or steam forming in the water reservoir 1 when the water is heated. However, it is also possible to provide two or more discharge orifices arranged, for example, adjacent to each other in the manner of a screen. The discharge orifices 9, 10 are arranged so as to be covered by the cavity of the cups 7, 8 having their rims resting on the plates 4, 5 of the support surface 3. At the lowermost point of the support surface 3 where the plates 4, 5 are joined together, a drain hole 11 is provided enabling condensation water to be carried off. Below the drain hole 11 on the side facing away from the support surface 3, a channel 24 is provided which is connected to an underlying collection container 26 (shown in broken lines) through a conduit 25. As a result, the condensation water, rather than flowing into the water reservoir 1, flows down along its side. To prevent vapors or steam from escaping uselessly to atmosphere through the permanently open drain hole 11, the channel 24 arranged underneath the drain hole 11 may be closed in the direction extending towards the plates 4, 5, so that there is no communication of the drain hole 11 with the open water reservoir 1.

The mode of operation of the device described is as follows:

When the water in the water reservoir 1 is heated by means of the heating spiral 2, depending on the heating temperature vapors or steam will form, rising and passing through the discharge orifices 9, 10 in the plates 4, 5 of the support surface 3 to reach the interior of the cups 7, 8 sitting with their rims on the plates 4, 5. The cups 7, 8 are then heated by convection and condensation of the vapors or steam. Experiments have shown that, in dependence upon the heated volume of water—the smaller the water volume, the shorter the heating time—, cup temperatures of about 50° C. are reached in about four minutes when the temperature of the water in the water reservoir 1 remains below the boiling point. When the water in the water reservoir 1 is heated to the boiling point, cup temperatures of about 65° C. can be reached.

As the cups 7, 8 are heated, vapors and steam will condense in the interior of the cups 7, 8 due to the temperature difference. The condensation water will flow to the support surface 3 of the plates 4, 5, accumulate at the lowermost point because of the inclined positions of the plates, and flow through the drain hole 11 provided at that point into the water reservoir 1.

FIG. 2 shows another embodiment of a device for the heating and keeping warm of cups, including a steam distribution chamber 12 having at its lower end a port 13 for connection to a steam generating means not shown. The steam generating means may be a pressure boiler or a thermoblock device of a hot water preparation apparatus, for example, which can be operated exclusively for preheating cups by means of, for example, a switch or a separate "preheat cup" setting, using a reduced supply of energy for generating steam or vapors.

The steam distribution chamber 12 has its upper side closed by a plate-shaped structure 14 having two support surfaces 15, 16 slightly inclined towards the center, a longitudinal rib structure 17 separating the surfaces. Each support surface 15, 16 is provided with discharge orifices of which only the discharge orifice 18 in support surface 15 is shown in the Figure. The discharge orifice 18 is closable by a flap structure 19 extending into the interior of the steam distribution chamber 12 and attached to the end of a two-armed lever 20. The lever 20 is pivotally mounted on a pin 21 inside the steam distribution chamber 12. Acting on the lever arm at the end remote from the flap structure 19 is a compression spring 22 which takes support upon the plate structure 14 and is biased such as to maintain the flap structure 19 in its closed position when the support surface 15 is vacant.

When a cup 23 is placed down on the support surface 15 as shown in the Figure, the weight of the cup 23 will cause the flap structure 19 to be urged downwardly into the interior of the steam distribution chamber 12 in opposition to the biasing force of the compression spring 22, thereby opening the discharge orifice 18 for the admission of steam to the cavity of the cup 23. Due to the inclined position of the support surface 15, condensation water forming inside the cup 23 is allowed to drain through the discharge orifice 18, entering the steam distribution chamber 12 whence it is returned to a collection container 26 separate from the steam generating means 2, as illustrated in FIG. 1. When the cup 23 is withdrawn or slips off because the appliance is tilted, the flap structure 19 will be moved to its closed position automatically by the biasing force of the compression spring 22, maintaining the discharge orifice 18 closed and thus preventing major quantities of steam or water from escaping any longer.

I claim:

1. In a beverage making appliance, beverage cup preheating apparatus comprising water reservoir structure, heater structure coupled to said water reservoir structure for heating water in said water reservoir structure, support surface structure above said water reservoir structure having a substantially imperforate lower surface directly exposed to upwardly rising water vapor from said water reservoir structure and a substantially imperforate upper surface for receiving a beverage cup for preheating, structure defining discharge port structure extending through said support surface structure for passing heated water vapor upwardly from said water reservoir structure to a beverage cup on said upper surface, and cup positioning structure in said support surface structure for positioning a beverage cup to be heated on said upper surface in alignment with said discharge port structure.

2. The apparatus of claim 1 wherein said upper surface of said support surface structure is inclined relative to the horizontal.

3. The apparatus of claim 2 wherein said upper surface of said support surface structure is comprised of at least two planar surfaces inclined in opposite directions.

4. The apparatus of claim 3 wherein said support surface structure includes collection structure for collection of condensed water at the lowermost point of said upper surface.

5. The apparatus of claim 4 wherein said collection structure comprises structure defining a drain hole in said support surface structure, and further including collection container structure and channel structure connecting said drain hole and said collection container structure.

6. The apparatus of claim 1 and further including valve structure for closing said discharge port structure.

7. The apparatus of claim 6 wherein said valve structure includes cup responsive operator structure adapted to move said valve structure to an open position when a cup is placed on said support surface structure.

8. The apparatus of claim 6 wherein said valve structure includes spring structure for maintaining said valve structure in closed position, said spring structure having a spring force of magnitude sufficient to be overcome by the weight of a cup.

9. The apparatus of claim 6 wherein said discharge port structure is in direct communication with said water reservoir structure.

10. The apparatus of claim 6 wherein said water reservoir structure is permanently upwardly open towards said support surface structure.

11. The apparatus of claim 10 wherein the area of said lower surface of said support surface structure corresponds in area to the size of said upwardly open water reservoir structure.

12. The apparatus of claim 1 wherein said upper surface of said support surface structure is inclined relative to the horizontal, and said support surface structure includes collection structure for collection of condensed water at the lowermost point of said upper surface.

13. The apparatus of claim 12 wherein said collection structure comprises structure defining a drain hole in said support surface structure, and further including collection container structure and channel structure connecting said drain hole and said collection container structure.

14. The apparatus of claim 12 and further including valve structure for closing said discharge port structure.

15. The apparatus of claim 14 wherein said valve structure includes cup responsive operator structure adapted to move said valve structure to an open position when a cup is placed on said support surface structure.

16. The apparatus of claim 15 wherein said valve structure includes spring structure for maintaining said valve structure in closed position, said spring structure having a spring force of magnitude sufficient to be overcome by the weight of a cup.

\* \* \* \* \*